US008814088B2

(12) United States Patent
Burrows (10) Patent No.: US 8,814,088 B2
(45) Date of Patent: Aug. 26, 2014

(54) AIRCRAFT CLASS DIVIDER (75) Inventor: Ralph Martin Burrows, Bellingham, WA (US)

(73) Assignee: Health Tecna Inc., Bellingham, WA (US)

(*) Notice: Subject to any disclaimer, the term of this patent is extended or adjusted under 35 U.S.C. 154(b) by 230 days.

(21) Appl. No.: 13/426,451

(22) Filed: Mar. 21, 2012

(65) Prior Publication Data
US 2013/0248651 A1    Sep. 26, 2013

(51) Int. Cl.
*B64D 11/00* (2006.01)

(52) U.S. Cl.
USPC ........................................... 244/118.5

(58) Field of Classification Search
USPC .............. 244/118.1, 118.5, 129.4, 129.5; 105/323; 52/29, 32, 64, 67, 69, 71, 52/238.1, 243.1; 312/248
See application file for complete search history.

(56) References Cited

U.S. PATENT DOCUMENTS

| 5,165,626 A | 11/1992 | Ringger et al. |
| 5,577,358 A | 11/1996 | Franke |
| 5,649,721 A | 7/1997 | Stafford et al. |
| 5,816,534 A | 10/1998 | Schumacher |
| 6,523,779 B1 * | 2/2003 | Michel ........................ 244/118.5 |
| 7,530,529 B2 | 5/2009 | Bock |
| 8,118,258 B2 | 2/2012 | Mosler et al. |
| 8,123,165 B2 * | 2/2012 | Breuer et al. ............... 244/118.5 |
| 8,550,143 B2 * | 10/2013 | Breuer et al. ............... 160/323.1 |
| 8,556,212 B2 * | 10/2013 | Breuer et al. ............... 244/118.6 |
| 2009/0230245 A1 | 9/2009 | Mosler et al. |
| 2012/0273613 A1 * | 11/2012 | Ulbrich-Gasparevic et al. ........................ 244/118.1 |

FOREIGN PATENT DOCUMENTS

RU    2008105036    8/2009

* cited by examiner

*Primary Examiner* — Tien Dinh
*Assistant Examiner* — Michael Kreiner
(74) *Attorney, Agent, or Firm* — Dwayne E. Rogge; Schacht Law Office, Inc.

(57) ABSTRACT

Disclosed herein is a divider providing part of a separation between sections of a passenger cabin of a commercial aircraft, the divider comprising several components. One component may be a support arm connected to the frame of an aircraft above a passenger seat, the support arm having an outer edge facing the aisle of the passenger cabin, and an inner edge which is adjacent the face of a luggage compartment when the bucket is in an open position. Another component may be a curtain attached to a lower edge of the support arm and projecting vertically below the support arm. Yet another component may be a rigid view block adjacent the face of the compartment and configured to reposition such that the view block is adjacent the face of the compartment while the compartment is in a closed position, and repositions when the compartment is opened.

13 Claims, 9 Drawing Sheets

AIRCRAFT CLASS DIVIDER

BACKGROUND OF THE DISCLOSURE

Field of the Disclosure

This disclosure relates to the field of class dividers, such as those used in passenger cabins of commercial aircraft to divide passenger sections.

SUMMARY OF THE DISCLOSURE

Disclosed herein is a divider in several embodiments, utilized to provide part of a visual separation between sections of a passenger cabin of a commercial aircraft. The divider comprising several inter-operating components. One component may be a support arm fixedly connected to the frame of an aircraft above a passenger seat, the support arm having an outer edge facing the aisle of the passenger cabin, and an inner edge which is adjacent the face of a luggage stowage compartment when the bucket is in an open position. Another component may be a curtain attached to a lower edge of the support arm and projecting vertically below the support arm. Yet another component may be a rigid view block adjacent the face of the luggage stowage compartment and configured to move therewith such that the view block is adjacent the face of the luggage stowage compartment while the luggage stowage compartment is in a closed position, and repositions when the stowage compartment is opened.

The divider as recited above may be arranged wherein the view block is attached to the face of the luggage stowage compartment to move therewith.

The divider as recited as recited above may be arranged wherein the view block pivots with the face of the luggage stowage compartment to move in conjunction therewith.

The divider as recited above may be arranged wherein the curtain is rigid. The divider may alternatively be arranged wherein the curtain comprises fabric or other non-rigid materials. In either case, the curtain may be positionably attached to the support arm.

The divider as recited above may be arranged wherein the curtain extends from the lower edge of the support arm, downward substantially to the top of the back of a passenger seat such that the passenger seat cooperates with the divider to visually separate the sections of the aircraft passenger cabin.

The divider as recited above may be arranged wherein the support arm comprises a surface or surfaces defining a gap in a lower edge thereof to allow passage of a portion of the view block therethrough. Alternatively, the view block may pass adjacent either the forward or rearward side of the support arm.

DESCRIPTION OF THE PREFERRED EMBODIMENTS

Before beginning a detailed description of the components, an axes system 10 is shown in the Figures to facilitate explanation of the relative positioning of the components. The axes system 10 utilizes a vertical axis 12, and a transverse axis 16 lying in a horizontal plane and generally orthogonal to the longitudinal axis of the aircraft body. The axes system 10 also comprises a longitudinal axis 14, in a horizontal plane and generally parallel to the longitudinal axis of the aircraft body. The relative terms inboard and outboard are used to describe relative positioning of one embodiment relative to the plane containing the longitudinal axis and the vertical axis and passing down the center of the aircraft. These relative terms are used in reference to bins (buckets) attached at positions adjacent the hull of the aircraft, although other attachment positions and orientations are still within the scope of the disclosure. This axes system the relative terms, and the axes defined are not intended to limit the disclosure, but are used to aid in description only.

Figure 2:
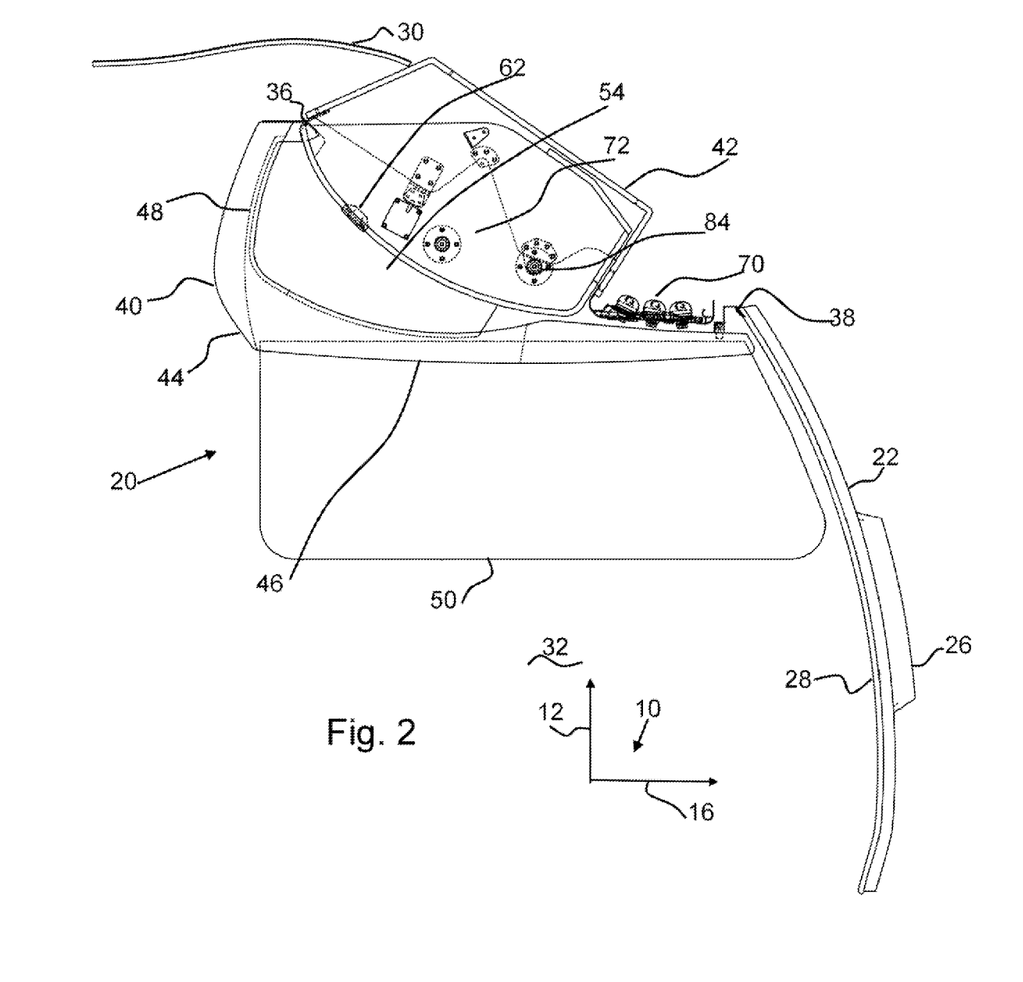
FIG. 2 is a face cutaway view of the embodiment of FIG. 1 with a luggage stowage compartment in a closed position.

Looking to FIG. 2, the divider 20 is shown attached to the frame 22 of an aircraft 25. A plurality of windows 26 are also attached to the frame, as well as an inner sidewall 28 and ceiling 30. While the divider 20 may be attached to any of these components, or attached to seats, flooring, or other components within the passenger cabin 32, the embodiment shown attaches to a luggage stowage compartment 42 at one end 36, and to the frame at a second end 38. The divider 20 may also be attached to the inboard passenger service unit rail.

Other types of visual blocks have been previously used to separate different sections of an aircraft passenger cabin, such as curtains which are often used to separate the First Class section from the Coach cabin. One such divider is described in U.S. Pat. No. 5,165,626. The advent of bucket style luggage stowage compartments 42 has resulted in these dividers being less than satisfactory in use. In the newer bucket style compartments, as the luggage bucket itself repositions when opening, prior divider/curtain combinations often interfered with operation of the bucket, were difficult to operate properly, or did not function well. Prior shelf-style compartments such as shown in the '626 patent did not cause such problems in divider use and operation, as the compartment door opened inward and upward, but the lower section of the compartment was generally stationary.

The divider shown herein may be used in conjunction with a aisle way curtain, and generally overcomes the challenges faced by implementation of bucket style luggage compartments.

The divider in several embodiments as shown in the figures comprises a support arm 40 which as previously mentioned may attach at a first end 36 to the luggage stowage compartment 42 or other components of the aircraft 25. The second end 38 of the support arm 40 may be attached to the frame 22, compartment 42, or other components of the aircraft 25. The support arm 40 has an outer edge 44 adjacent the aisleway of the aircraft passenger cabin, a lower edge 46 adjacent a curtain 50, an inner edge 48 forming a cutout to allow the face 52 of the stowage compartment 42 to open without interference. As it may be desired to position the divider 20 at any longitudinal position along the compartment 42, this arrangement is beneficial in many aspects. It will usually be advantageous to avoid positioning the divider 20 longitudinally in the cabin where it may interfere with the latches 62 of the compartment faces, and/or the passenger service units (PSU) 68 which often utilize lights 70 as seen in FIG. 2. In one embodiment, the divider is positioned above the seat back of a passenger seat, where it is unlikely to interfere with a PSU.

In one form, the curtain 50 is attached to the lower edge of the support arm 40 and is supported thereby. The curtain 50 may be comprised of a rigid material such as wood, polymers, resin impregnated fiberglass, or alternately be a non-rigid material such a woven fabric, thin sheet polymers, or equivalents of either sort. When non-rigid materials are used, the curtain may be positionably attached to the support arm, such as by rings, sliders, or equivalents so as to be repositionable. During take-off and landing for example, it may not be desired to block the view of air marshals and crew between sections of an aircraft. The curtain may extend downward a short distance, all the way to the floor of the passenger cabin, or may extend to the bottom of a passenger seat-back in such a way that the seat back in a fully upright position provides additional view separation between sections of the aircraft.

To visually block the region between the support arm 40 and the face 52 of the compartment 42, a positionable view block 54 may be utilized. The view block may be attached to the face 52 of the compartment 42, or it may be pivotably connected to the support arm 40, with a resilient member such as a spring, to bias the view block 54 against the face 52 of the compartment 42.

Figure 1:
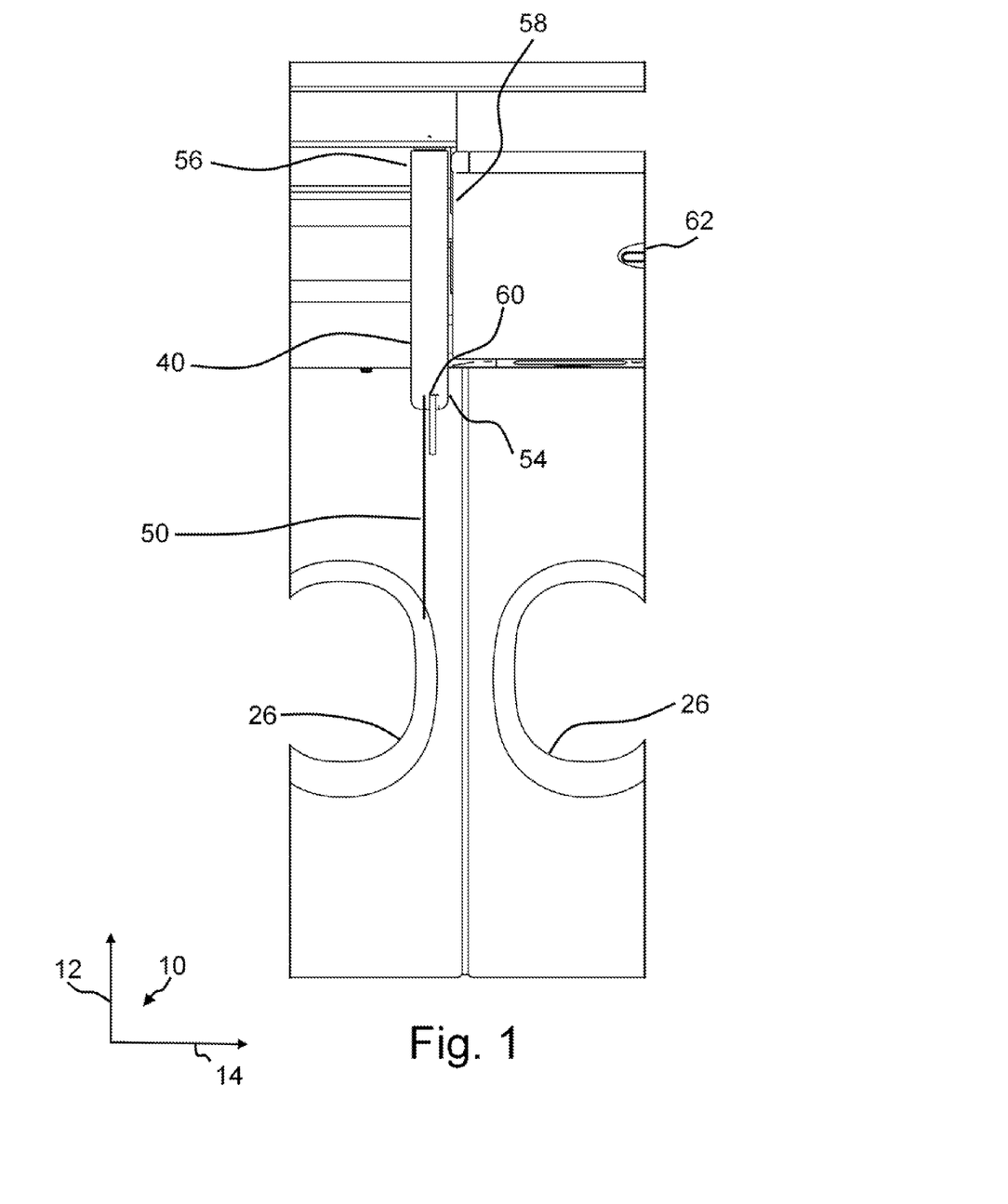
FIG. 1 is an end view of one embodiment of the invention.
Figure 3:
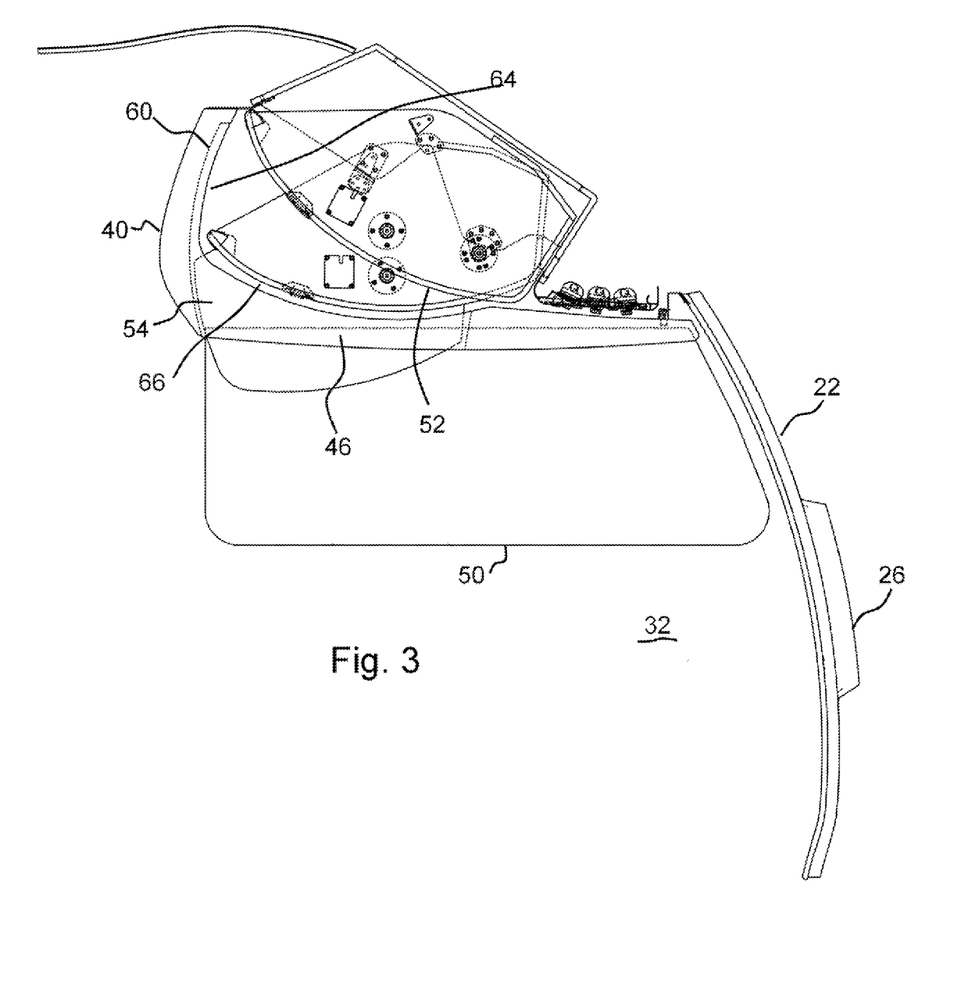
FIG. 3 is a face cutaway view of the embodiment of FIG. 1 with the luggage stowage compartment shown in an open position, and in a closed position.
Figure 4:
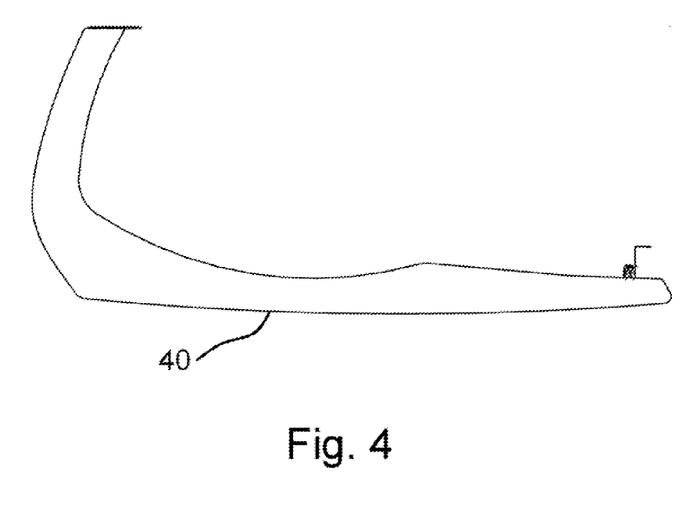
FIG. 4 is a face view of a support arm component of the embodiment of FIG. 1.
Figure 5:
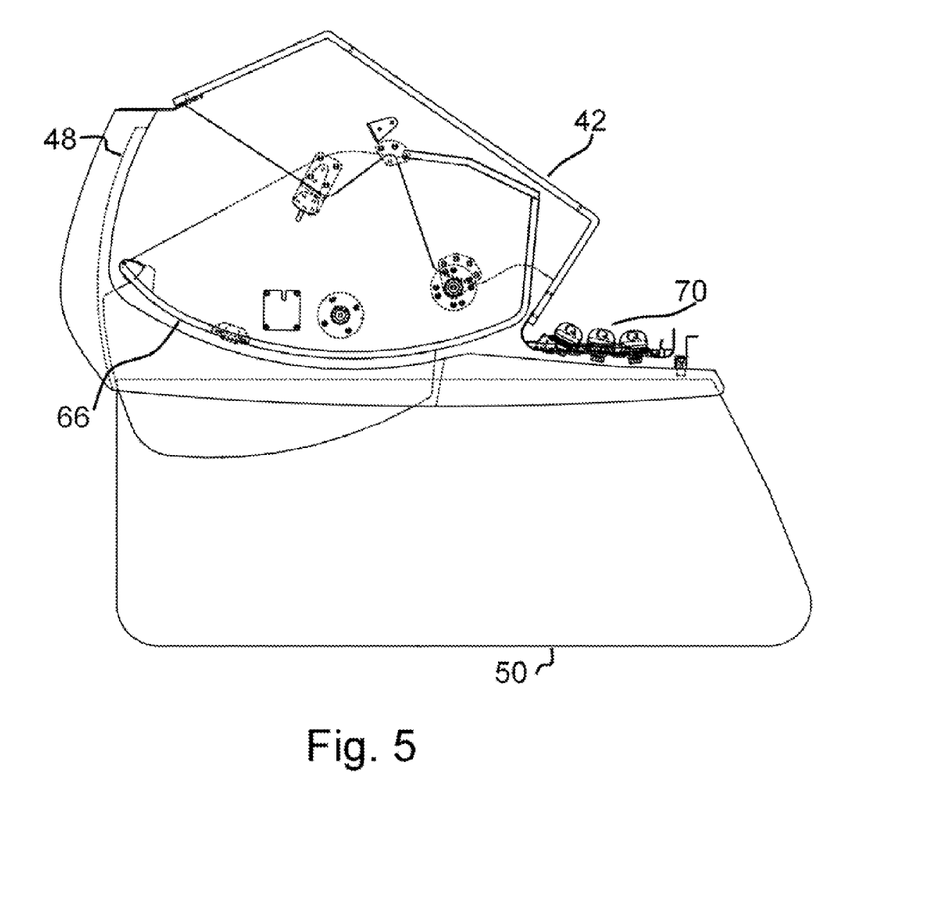
FIG. 5 is a face view of the embodiment of FIG. 3 with several components removed.
Figure 6:
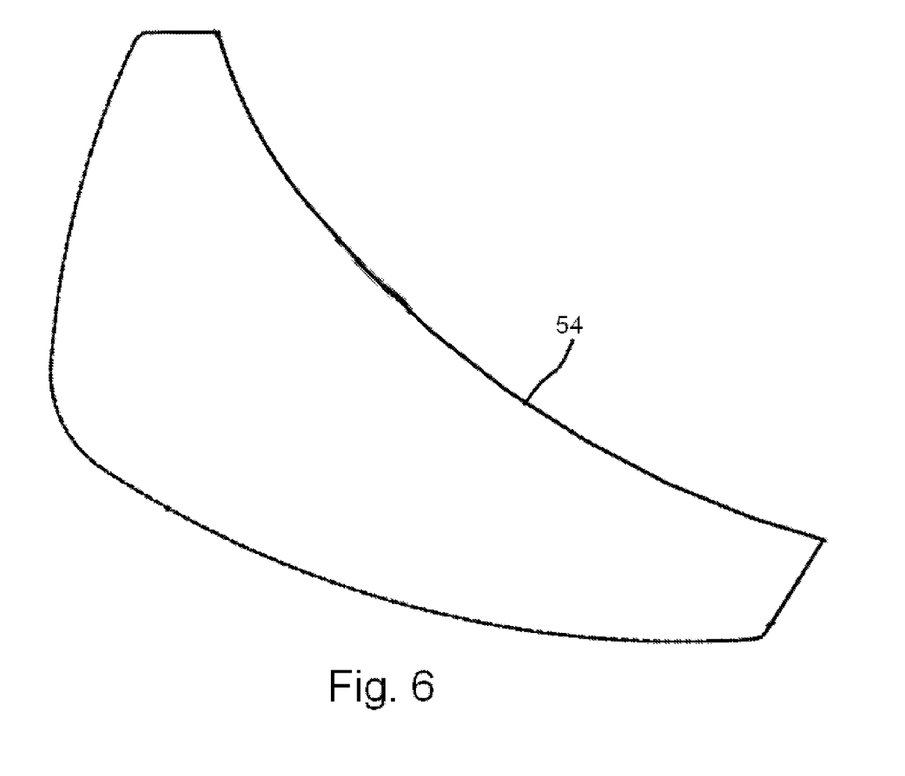
FIG. 6 is a face view of a view block component of FIG. 1.

While the view block 54 may be adjacent either the longitudinally forward side 56 or longitudinally rearward side 58 of the support arm 40 as shown in FIG. 1. One embodiment employs a gap 60 in the lower edge 46 of the support arm 40 for the view block 54 to extend into and possibly extend beyond as shown in FIG. 3. Thus, when the compartment 42 is closed, the view block 54 may extend only a short distance into the gap 60. When the compartment 42 is opened, as shown in one example in FIG. 3, The view block repositions from the closed compartment position 64, to the open compartment position 66.

The view block in one form may also reposition from an extended position when the compartment 42 is closed, to a position substantially within, and in one form not extending beyond, the support arm 40 and/or curtain 50.

Figure 7:
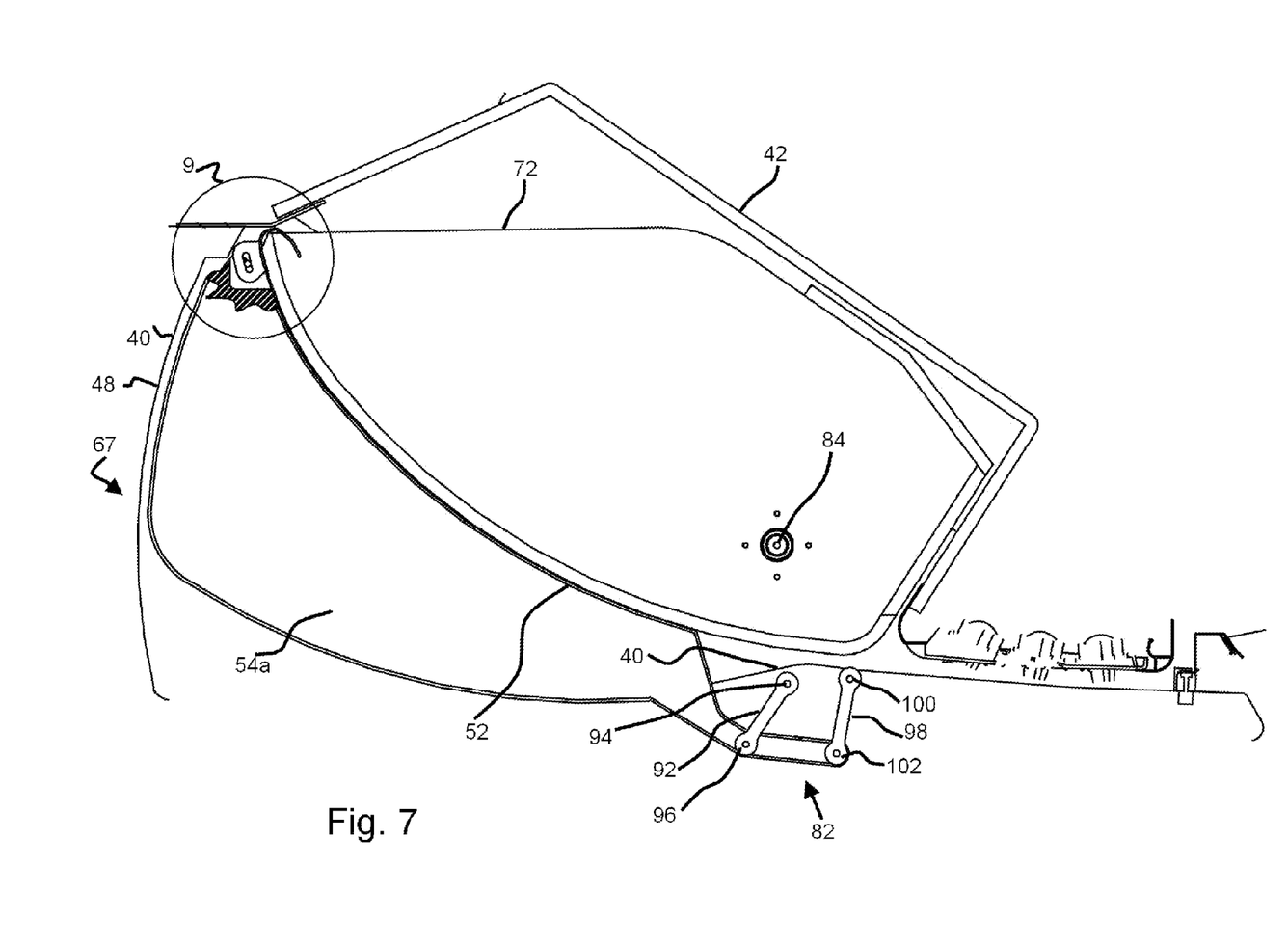
FIG. 7 is a face cutaway view of a second embodiment of with the luggage stowage compartment in a closed position.
Figure 8:
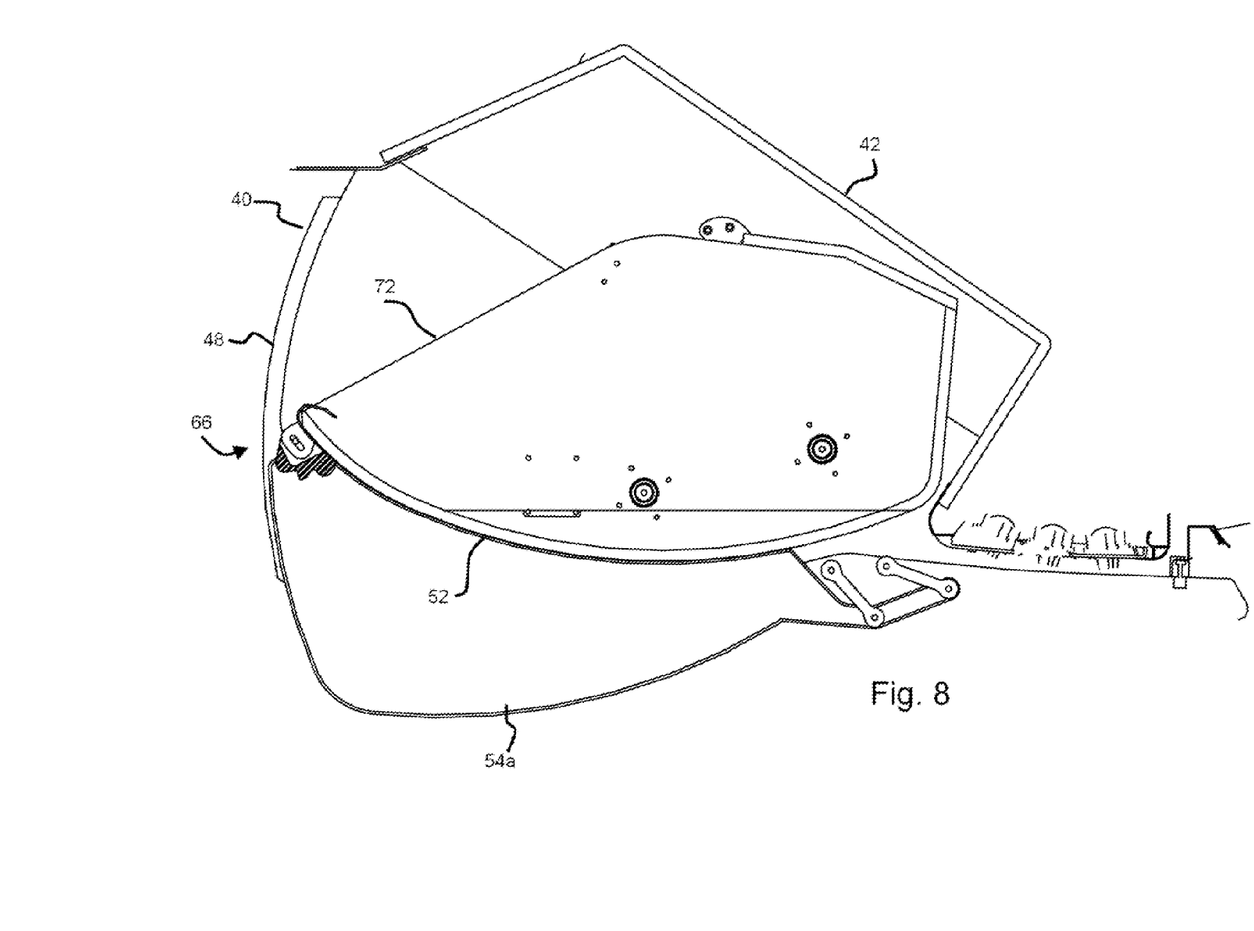
FIG. 8 is a face cutaway view of the embodiment of FIG. 7 with the luggage stowage compartment shown in a closed position.
Figure 9:
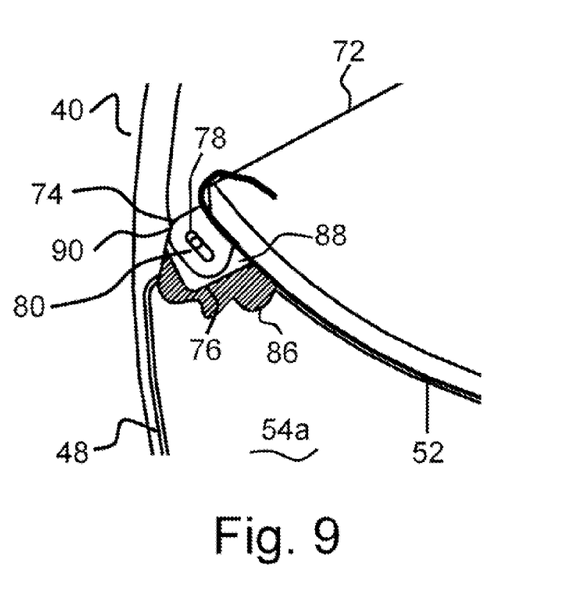
FIG. 9 is a cutaway detail view of an upper attachment device as shown in area 9 of FIG. 7.

A second embodiment is shown in FIGS. 7, 8 and 9. In this second embodiment, components similar to those in the first embodiment are denoted with an "a" suffix. For example, the view block of the first embodiment is labeled as 54, while the view block of the second embodiment is similar, and is labeled as 54a.

In this second embodiment, the view block 54a is attached to the face 52 of the bucket 72 in a very different manner. In this embodiment a bracket 74 is attached to the face 52 of the bucket 72 by way of fasteners, adhesive, or by clamping to the upper edge of the bucket face 52. The bracket 74 extends generally orthogonal to the face 52 of the bucket 72 and provides an attachment location 76 for the view block 54a to attach to, again by way of fasteners, adhesive, or the bracket 74 may be molded with the view block 54 as a unitary structure.

In the embodiment of FIG. 9, the bracket 74 comprises a surface defining a slot 78 which receives a guide pin 80 which is allowed to reposition somewhat therein. This slot 78 is provided where the outboard attachment mechanism 82 is not centered about the pivot 84 shown in FIG. 7 of the bucket 72 which may therefore be configured to allow some degree of relative motion between the view block 54a and the face 52 to avoid binding during operation (opening and closing) of the bucket 72.

In the embodiment shown, the view block 54a is cutout portion 86 is shown to allow viewing of the internal channel 88 which receives the transversely extending portion 90 of the bracket 74 to aid in structural support, and to prohibit small items such as fingers from getting caught (pinched) in the apparatus during operation. The guide pin 80 in this embodiment passes through the channel 88.

The outboard attachment location 82 shown in FIG. 7 comprises an offset four bar linkage which provides for rotation and movement of the view block 54a in a similar arc to that transcribed by the bucket 72 about the pivot 84. The four bar linkage comprises a plurality of link arms 92 and 98. The first link arm is an inboard link arm 92, attached to the support arm 40, frame 22, compartment 42, or other portions of the aircraft at an upper attachment location (pivot) 94; and at a lower attachment location (pivot) 96 to the view block 54a. The second link arm is an outboard link arm 98, attached to the support arm 40, frame 22, compartment 42, or other portions of the aircraft at an upper attachment location (pivot) 100; and at a lower attachment location (pivot) 102 to the view block 54a. As the distance between the axes of the upper pivots 94/100 in one embodiment is less than the distance between the lower pivots 96/102, the effective pivot radius of the view block 54a will be similar to the pivot radius of the bucket pivot 84. Thus there will be very little relative motion between the face 52 of the bucket 72 and the view block 54a. As previously mentioned, the slot 78 allows for such relative motion.

Generally, the view block 54a outboard attachment mechanism engages a support arm 40 at the outboard attachment location 82 as shown in FIG. 2 and described above.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A divider utilized to provide part of a visual separation between sections of a passenger cabin of a commercial aircraft, the divider comprising:
 a) a support arm fixedly connected to the frame of an aircraft in a plane above a passenger seat and extending below a luggage stowage compartment;
 b) a curtain attached to a lower edge of the support arm and projecting vertically below the support arm,
 c) a rigid view block adjacent the face of the luggage stowage compartment and configured to move therewith such that the view block is adjacent the face of the luggage stowage compartment while the luggage stowage compartment is in a closed position, and repositions when the stowage compartment is opened, and;
 d) wherein at least a portion of the view block is vertically higher than a lowermost edge of the support arm when the luggage stowage compartment is in the closed position and at least a portion of the view block is vertically lower than the lowermost edge of the support arm when the luggage stowage compartment is in the open position.

2. The divider as recited in claim 1 wherein the view block is attached to the face of the luggage stowage compartment to move therewith.

3. The divider as recited in claim 1 further comprising:
a) a pivot linkage connecting one end of the view block to the aircraft; and
b) a bracket connecting an opposing end of the view block to the face of the luggage stowage compartment.

4. The divider as recited in claim 1 wherein the view block pivots with the face of the luggage stowage compartment to move in conjunction therewith.

5. The divider as recited in claim 1 wherein the curtain is rigid and fixed in position below the luggage stowage compartment.

6. The divider as recited in claim 1 wherein the curtain comprises fabric.

7. The divider as recited in claim 1 wherein the curtain is positionably attached to the support arm.

8. The divider as recited in claim 1 wherein the curtain extends from the lower edge of the support arm, downward substantially to the top of the back of a passenger seat such that the passenger seat cooperates with the divider to visually separate the sections of the aircraft passenger cabin.

9. The divider as recited in claim 1 wherein the support arm comprises a surface or surfaces defining a gap in a lower edge thereof to allow passage of a portion of the view block therethrough.

10. The divider as recited in claim 1 wherein:
a) the support arm comprises a first end attached to the frame of the aircraft inboard and above the luggage stowage compartment; and
b) a second end attached to the frame of the aircraft outboard and below the luggage stowage compartment.

11. A divider utilized to provide part of a visual separation between sections of a passenger cabin of a commercial aircraft, the divider comprising a) a support arm fixedly connected to the frame of an aircraft in a plane above a passenger seat and below a luggage stowage compartment;
b) a curtain attached to a lower edge of the support arm and projecting vertically below the support arm
c) a rigid block adjacent the face of the luggage stowage compartment and configured to move therewith such that the view block is adjacent the face of the luggage stowage compartment while the luggage stowage compartment is in a closed position, and repositions when the stowage compartment is opened,
d) a pivot linkage connecting one end of the view block to the aircraft
e) a bracket connecting an opposing end of the view block to the face of the luggage stowage compartment
f) wherein the pivot linkage is a four-bar linkage comprising:
g) an inboard arm attached at an inboard upper pivot to the aircraft frame and at a lower inboard pivot to the view block, and
h) an outboard link arm attached at an outboard upper pivot to the aircraft frame and at a lower outboard pivot to the view block.

12. The divider as recited in claim 11 wherein:
a) the inboard link arm is attached at the inboard upper pivot to the aircraft frame through the support arm; and at a lower inboard pivot to the view block, and
b) the outboard link arm attached at the outboard upper pivot to the aircraft frame through the support arm; and at a lower outboard pivot to the view block.

13. The divider as recited in claim 11 wherein the distance between centers of rotation of the inboard upper pivot and the outboard upper pivot is not equal to the distance between centers of rotation of the inboard lower pivot and the outboard lower pivot.

\* \* \* \* \*